(12) United States Patent
Chen et al.

(10) Patent No.: US 8,241,778 B2
(45) Date of Patent: Aug. 14, 2012

(54) BATTERY OF PORTABLE ELECTRONIC DEVICE

(75) Inventors: Yang-Yuan Chen, Taipei Hsien (TW); Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 309 days.

(21) Appl. No.: 12/613,471

(22) Filed: Nov. 5, 2009

(65) Prior Publication Data

US 2011/0070473 A1    Mar. 24, 2011

(30) Foreign Application Priority Data

May 14, 2012   (CN) .......................... 2009 1 0307469

(51) Int. Cl.
*H01M 2/10* (2006.01)
*H01M 2/00* (2006.01)
*H01M 2/04* (2006.01)

(52) U.S. Cl. ............................ 429/100; 429/65; 429/176
(58) Field of Classification Search .................... 429/99, 429/100, 97, 163, 176, 178, 179, 186, 7, 429/65

See application file for complete search history.

(56) References Cited

FOREIGN PATENT DOCUMENTS

| JP | 04-154042 | * | 5/1992 |
| JP | 04-155749 | * | 5/1992 |

* cited by examiner

*Primary Examiner* — Ula C. Ruddock
*Assistant Examiner* — Thomas H. Parsons
(74) *Attorney, Agent, or Firm* — Altis Law Group, Inc.

(57) ABSTRACT

A mobile phone battery includes a battery body and a protecting structure. The battery body includes positive and negative electric poles formed on a side wall of the battery body. The protecting structure is movably set on the battery body. The protecting structure includes a protecting piece. The protecting piece is operable to cover or expose one of the electric poles.

4 Claims, 3 Drawing Sheets

BATTERY OF PORTABLE ELECTRONIC DEVICE

BACKGROUND

1. Technical Field

The present disclosure relates to a battery of a portable electronic device.

2. Description of Related Art

When mobile phone batteries are not in use, users usually place the batteries at some places without much attention. In certain circumstances, such as a humid environment, can short-circuit the positive and negative electric poles of a mobile phone battery.

DETAILED DESCRIPTION

Figure 1:
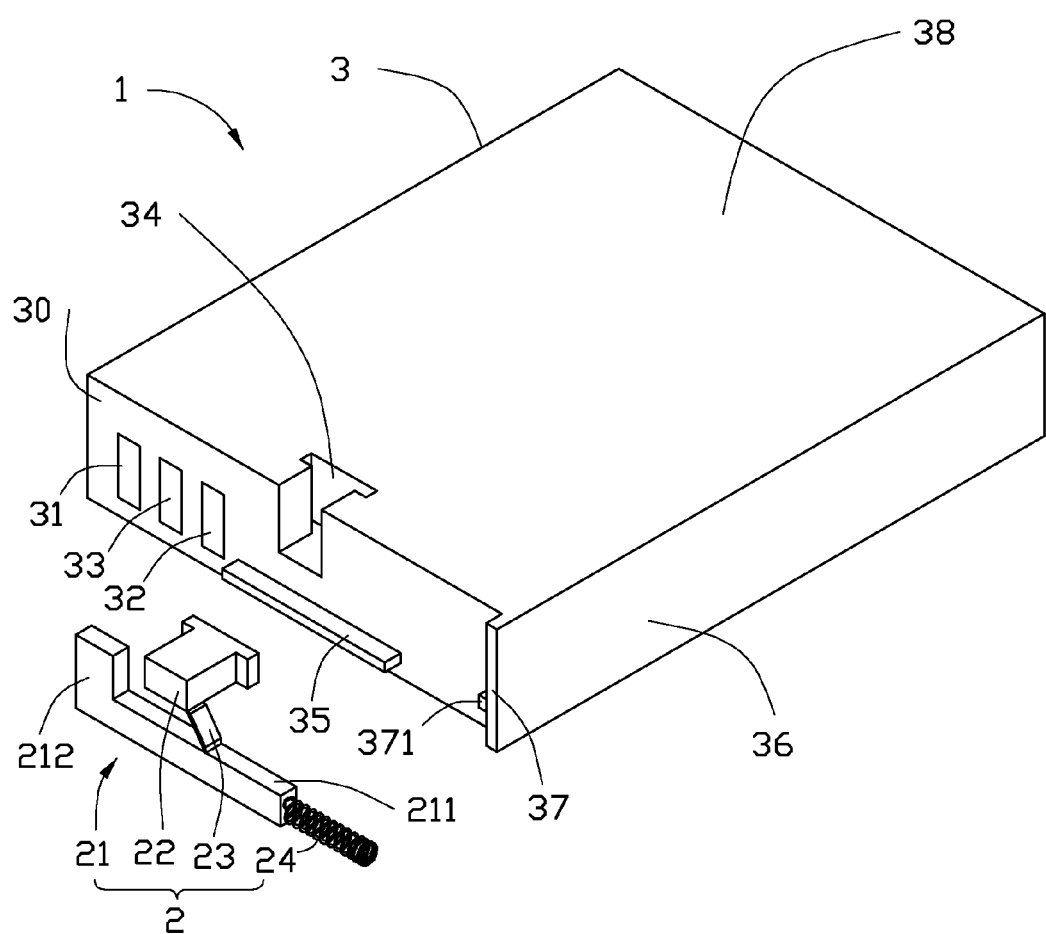
FIG. 1 is an exploded, isometric view of an exemplary embodiment of a portable electronic device battery.

Referring to FIG. 1, an exemplary embodiment of a portable electronic device battery 1, such as a mobile phone battery, includes a battery body 3 and a protecting structure 2.

The battery body 3 is a substantially rectangle-shaped, and includes a first side wall 30, a second side wall 36 perpendicularly connected to a first end of the first side wall 30, and a third side wall 38 perpendicularly connected to a first side of the first side wall 30 and perpendicularly connected to the second side wall 36. A first electric pole 31, a second electric pole 32, and a third electric pole 33 are formed on the first side wall 30, adjacent to a second end opposite to the first end of the first side wall 30. The first electric pole 31, the second electric pole 32, and the third electric pole 33 charge or discharge for the battery body 3. The third electric pole 33 is located between the first electric pole 31 and the second electric pole 33. The first electric pole 31 is a positive electric pole. The second electric pole 32 is a negative electric pole. The third electric pole 33 is a preset electric pole, and function of the third electric pole 33 can be defined according to need. A T-shaped sliding groove 34 is defined in the third side wall 38 of the battery body 3, through the first side wall 30. A great end of the sliding groove 34 is opposite to the first side wall 30. A supporting tab 35 extends from a second side opposite to the first side of the first side wall 30, perpendicular to the second side wall 36. A resisting tab 37 extends from the second side wall 36, adjacent to and perpendicular to the first side wall 30. A protrusion 371 protrudes from the resisting tab 37 towards the supporting tab 35.

The protecting structure 2 includes an elastic member (e.g., a spring 24), a protecting piece 21, a connecting portion 23, and a movement block 22. The protecting piece 21 is substantially L-shaped, and includes a horizontal long pole 211 and a vertical short pole 212 perpendicularly extending from a first end of the long pole 211. The short pole 212 is used to cover the second electric pole 32. A first terminal of the spring 24 is fixed to a second end opposite to the first end of the long pole 211. The movement block 22 is substantially T-shaped, to be elastically slidably engaged in the sliding groove 34. A first end of the connecting portion 23 is rotatably connected to a bottom of the movement block 22, and a second end of the connecting portion 23 is rotatably connected to a center of the long pole 211 of the protecting piece 21. The connecting portion 23 can be connected to the movement block 22 and the protecting piece 21 via hinges. The technology of rotatably connecting the connecting portion 23 to the movement block 22, and rotatably connecting the connecting portion 23 to the protecting piece 21 is known.

Figure 2:
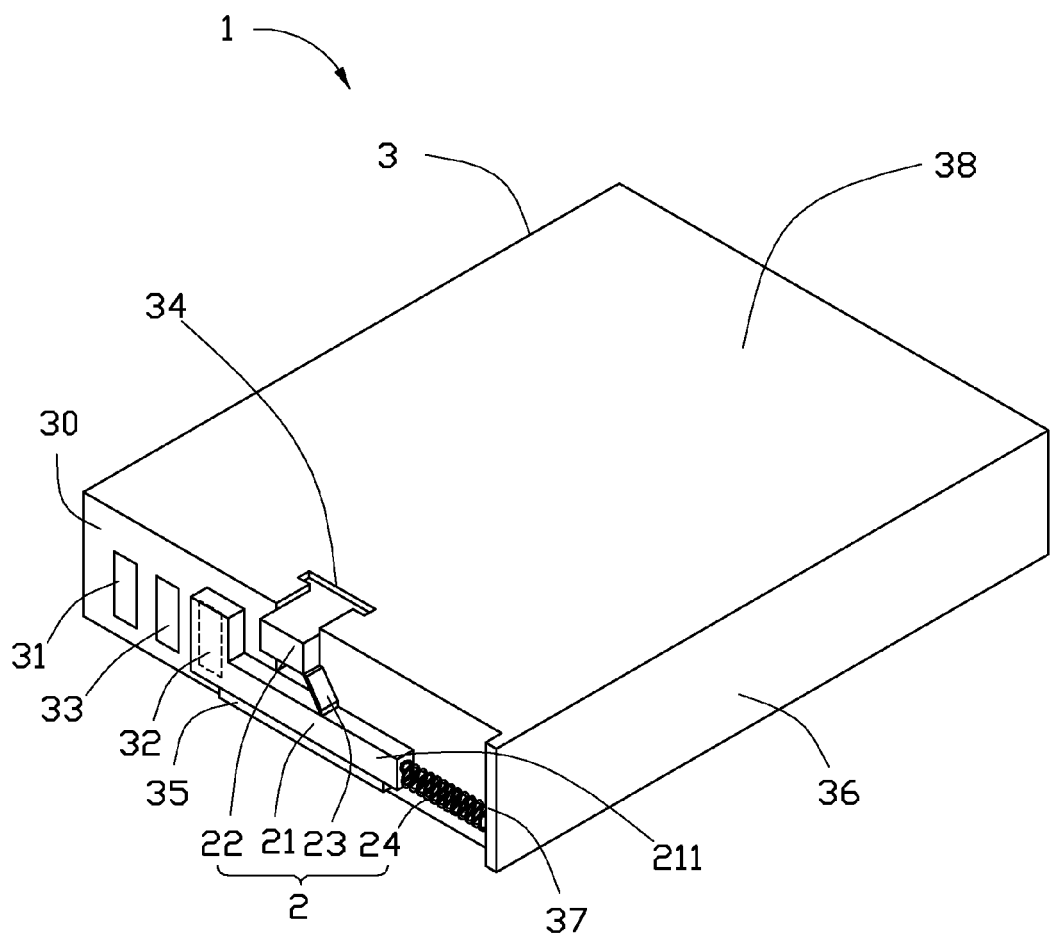
FIG. 2 is an assembled view of the battery of FIG. 1.

Referring to FIG. 2, in assembly, the movement block 22 is inserted into the sliding groove 34. The long pole 211 of the protecting piece 21 is supported on the supporting tab 35. A second terminal of the spring 24 is fitted about the protrusion 371. The short pole 212 of the protecting piece 21 covers the second electric pole 32. The portable electronic device battery 1 is at an unused state. The first electric pole 31 and the second electric pole 32 of the battery body 3 will not be short-circuited.

Figure 3:
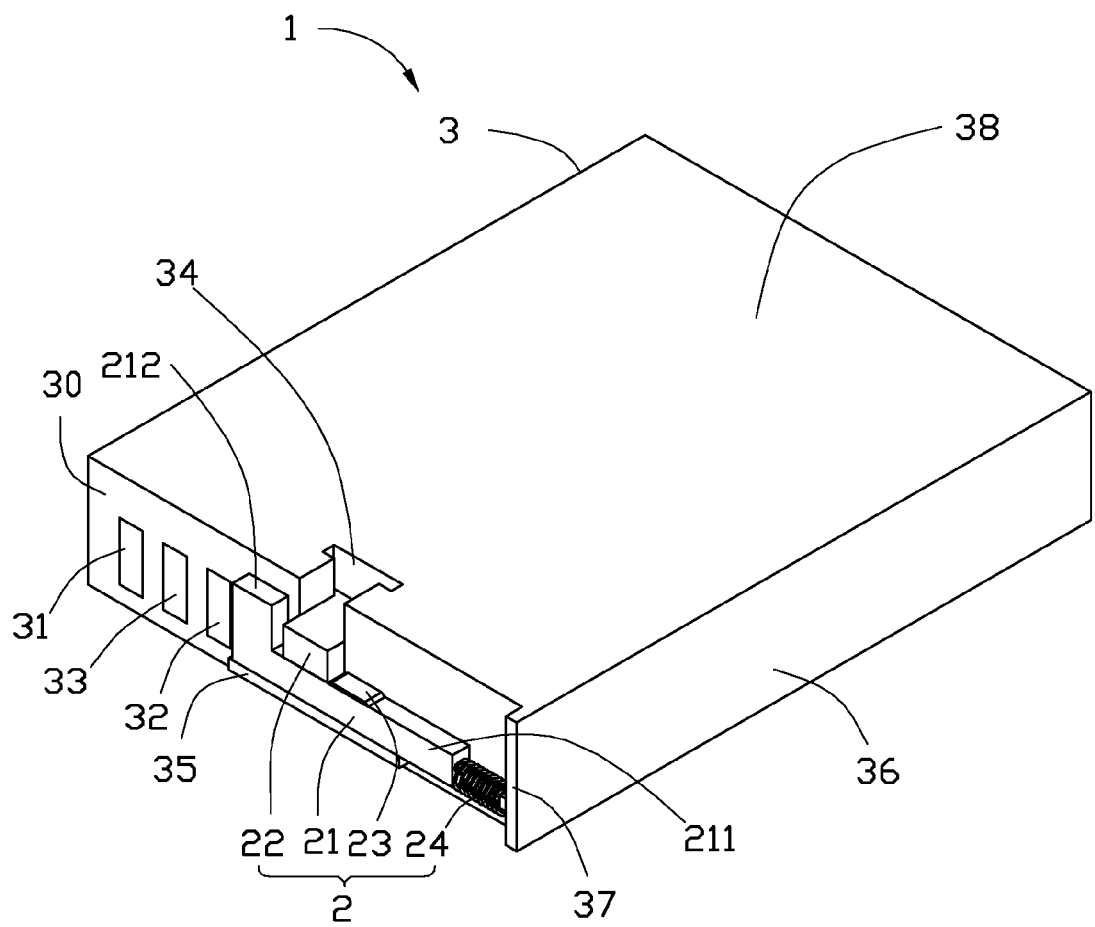
FIG. 3 is a similar to FIG. 2, but showing a using state of the battery.

Referring to FIG. 3, in use, a battery accommodating body of the portable electronic device receives the battery 1. Three metal pieces are set on the battery accommodating body of the portable electronic device, respectively to the first electric pole 31, the second electric pole 32, and the third electric pole 33 of the battery 1. A drive portion is set on the battery accommodating body. When the battery 1 is inserted into the battery accommodating body of the portable electronic device, the drive portion is inserted into the gliding groove 34, to drive the movement block 22 to move towards the bottom of the sliding groove 34. Therefore, the connecting portion 23 gradually moves to overlap the long pole 211 of the protecting piece 21, to drive the long pole 211 to move towards the tab 37 on the supporting tab 35, at the same time, the spring 24 is compressed. When the movement block 22 moves to the bottom of the sliding groove 34, the short pole 212 of the protecting piece 21 moves away from the second electric pole 32 to expose the second electric pole 32. The metal pieces of the battery accommodating body are electrically connected to the first electric pole 31, the second electric pole 32, and the third electric pole 33, respectively.

The movement block 22 of the battery 1 can slide relative to the battery body 3, to drive the protecting piece 21 covers or exposes the second electric pole 32. The battery 1 can avoid short-circuit in an unused state.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A portable electronic device battery comprising:
    a battery body comprising:
        a first side wall;
        a positive electric pole formed on the first side wall;
        a negative electric pole formed on the first side wall; and
        a supporting tab extending from the first side wall;
        a second side wall perpendicularly connected to a first end of the first side wall;
        a resisting tab extended from an end of the second side wall, adjacent to and perpendicular to the first side wall;

a third side wall perpendicularly connected to the first side wall and the second side wall;

a sliding groove defined in the third side wall and extending through the first side wall; and a protecting structure slidably mounted to the battery body, the protecting structure comprising:

a protecting piece to cover one of the positive and negative electric poles, wherein the protecting piece is substantially L-shaped and comprises a long pole supported on the supporting tab and a short pole perpendicularly extending from a first end of the long pole;

a resilient member, wherein a first terminal of the resilient member is fixed to a second end opposite to the first end of the long pole, and a second terminal of the resilient member is connected to the resisting tab;

a connecting portion, wherein a first end of the connecting portion is rotatably connected to the movement block, and a second end opposite to the first end of the connecting portion is rotatably connected to the long pole of the protecting piece; and a movement block, wherein the movement block is movably engaged in the sliding groove, when the movement block moves towards the bottom of the sliding groove, the connecting portion gradually moves to overlap the long pole of the protecting piece, to drive the long pole to move towards the resisting tab on the supporting tab, the resilient member is compressed, when the movement block moves to the bottom of the sliding groove, the short pole of the protecting piece is operable to expose one of the positive and negative electric poles.

2. The portable electronic device battery of claim 1, wherein the sliding groove is substantially T-shaped, and a great portion of the sliding groove is formed on the third side wall, the movement block is substantially T-shaped for fitting in the sliding groove.

3. The portable electronic device battery of claim 1, wherein a protrusion is protruded from the resisting tab towards the supporting tab, to connect with the second terminal of the resilient member.

4. A portable electronic device battery comprising:

a battery body comprising a first side wall, a positive electric pole and a negative electric pole formed on the first side wall, a supporting tab and a resisting tab extending from the first side wall, a second side wall extending perpendicularly from the first side wall, a third side wall extending perpendicularly from the first and second side wall, a sliding groove defined in the third side wall along a direction perpendicular to the supporting tab and extending through the first side wall;

a protecting structure comprising a protecting piece, a movement block, a connecting portion having two ends pivotably connected to the protecting piece and the movement block respectively, and an elastic member, wherein the protecting piece is slidably supported on the supporting tab, the movement block is slidably received in the sliding groove, the elastic member connected between the resisting tab and a first end of the protecting piece;

wherein when the movement block is moved toward the protecting piece, the protecting piece is moved away from and exposes at least one of the positive and negative electric poles, and when the movement block is moved away from the protecting piece, the protecting piece is moved to cover said at least one of the positive and negative electric poles.

* * * * *